United States Patent
Holschuh et al.

(10) Patent No.: US 9,952,341 B2
(45) Date of Patent: Apr. 24, 2018

(54) SYSTEMS AND METHODS FOR ALIGNING A MONITOR SEISMIC SURVEY WITH A BASELINE SEISMIC SURVEY

(71) Applicant: Chevron U.S.A. Inc., San Ramon, CA (US)

(72) Inventors: Nicholas D. Holschuh, State College, PA (US); Chang Li, Houston, TX (US); Mark A. Meadows, San Ramon, CA (US); Steven Dobbs, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 532 days.

(21) Appl. No.: 14/565,117

(22) Filed: Dec. 9, 2014

(65) Prior Publication Data

US 2016/0161619 A1    Jun. 9, 2016

(51) Int. Cl.
*G01V 1/30* (2006.01)
*G01V 1/36* (2006.01)

(52) U.S. Cl.
CPC .............. *G01V 1/308* (2013.01); *G01V 1/303* (2013.01); *G01V 1/36* (2013.01); *G01V 2210/57* (2013.01); *G01V 2210/58* (2013.01); *G01V 2210/612* (2013.01); *G01V 2210/6222* (2013.01)

(58) Field of Classification Search
CPC .......... G01V 1/308; G01V 1/36; G01V 1/303; G01V 2210/58; G01V 2210/612; G01V 2210/6222; G01V 2210/57
USPC .......................................................... 702/18
See application file for complete search history.

(56) References Cited

U.S. PATENT DOCUMENTS

2011/0232902 A1* 9/2011 Chu .................. G01V 1/30
166/250.01

FOREIGN PATENT DOCUMENTS

WO    WO2011/034870 A1    3/2011

OTHER PUBLICATIONS

PCT International Search Report and Written Opinion, International App. No. PCT/US2015/022640, dated Jun. 16, 2016.
H. Back et al., Time/Amplitude warping based on multiscale optimization, (2014) SEG Denver 2014 Annual Meeting, pp. 4868-4872.
D. Hale, A method for estimating apparent displacement vectors from time-lapse seismic images, (Sep. 1, 2009), Geophysics, Society of Exploration Geophysicists, US vol. 74, No. 5.

(Continued)

*Primary Examiner* — Bo Fan
(74) *Attorney, Agent, or Firm* — Andrew J. Lagatta; Marie L. Clapp; Melissa M. Hayworth

(57) ABSTRACT

Systems, methods, and mediums may implement obtaining baseline traces of a baseline seismic survey and monitor traces of a monitor seismic survey; employing a computer to align the monitor traces to corresponding baseline traces using an error function having a phase-based component, thereby obtaining an aligned monitor survey; generating with the computer a comparison of the aligned monitor survey to the baseline seismic survey; and using the comparison of the aligned monitor survey to the baseline seismic survey to determine a change in the subterranean hydrocarbon producing reservoir.

21 Claims, 7 Drawing Sheets

(56) References Cited

OTHER PUBLICATIONS

R. Zhang et al., Time-lapse seismic data registration and inversion for $CO_2$ sequestration study at Cranfield, (Nov. 1, 2013), Geophysics, Society of Exploration Geophysicists, US vol. 78, No. 6.
PCT International Preliminary Report on Patentability, International App. No. PCT/US2015/022640, Jun. 22, 2017, pp. 1-7.

* cited by examiner

SYSTEMS AND METHODS FOR ALIGNING A MONITOR SEISMIC SURVEY WITH A BASELINE SEISMIC SURVEY

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE DISCLOSURE

The present disclosure relates generally to systems and methods for seismic imaging of the Earth's subsurface and, in particular, systems and methods for aligning a monitor seismic survey with a baseline seismic survey.

BACKGROUND

Scientists and engineers often employ geophysical surveys for exploration and engineering projects. Geophysical surveys can provide information about underground structures, including formation boundaries, rock types, and the presence or absence of fluid reservoirs. Such information greatly aids searches for water, geothermal reservoirs, and mineral deposits such as hydrocarbons and ores. Oil and gas companies in particular often invest in extensive seismic and electromagnetic surveys to select sites for exploratory wells.

Geophysical surveys can be performed on land or in water using active seismic sources such as air guns, vibrator units, or explosives to generate seismic waves. Receivers such as hydrophones or geophones detect reflections of such waves from subsurface structures. The generating and receiving process is repeated with different source positions and optionally with different receiver positions. The arrangement of sources and receivers may be customized to achieve adequate coverage of the region of interest while facilitating processing of the acquired seismic data. The acquired seismic data is recorded and processed to provide a seismic image that may be used to identify subterranean features of interest.

The survey process may be periodically repeated to enable monitoring of the subsurface over time, e.g., as hydrocarbons are produced from a reservoir. A four dimensional, or 4D, seismic survey includes performing three-dimensional seismic surveys over time. When such repetition occurs, the initial survey may be termed the "baseline" survey, and subsequent surveys that are taken at later times may be termed "monitor" surveys. Monitoring is achieved by comparing the baseline survey to each of the monitor surveys, e.g., by differencing the seismic images to highlight those areas where changes have occurred over the time intervals (typically years or decades) between surveys.

However, such comparisons may face unexpected obstacles. For example, the extracted reservoir fluids may be displaced by other fluids and/or pore compression, causing the seismic wave velocities to change in the region of interest. Such wave velocity changes cause apparent shifting of the seismic horizons (at least in the unmigrated seismic images or migrated images derived with an uncorrected velocity model), which, in turn, creates the appearance of substantial changes even in areas where none has occurred. One existing approach to removing such apparent horizon shifts, called "time-warping", is susceptible to warping error, a form of over-correction that obscures the actual changes that are sought by this comparison.

SUMMARY

Accordingly, described herein are implementations of various approaches for aligning a monitor seismic survey with a baseline seismic survey. The disclosed embodiments include at least:

A seismic monitoring method for determining a change in a subterranean hydrocarbon producing reservoir, including: obtaining baseline traces of a baseline seismic survey during a first time period and monitor traces of a monitor seismic survey during a second time period, the baseline seismic survey and the monitor seismic survey representative of the subterranean hydrocarbon producing reservoir; employing a computer to align the monitor traces to corresponding baseline traces using an error function having a phase-based component, thereby obtaining an aligned monitor survey; generating with the computer a comparison of the aligned monitor survey to the baseline seismic survey; and using the comparison of the aligned monitor survey to the baseline seismic survey to determine a change in the subterranean hydrocarbon producing reservoir.

A seismic monitoring system for determining a change in a subterranean hydrocarbon producing reservoir, including: a data source that includes a baseline seismic survey, obtained during a first time period, including baseline traces and a monitor seismic survey, obtained during a second time period, including monitor traces, the baseline seismic survey and the monitor seismic survey representative of the subterranean hydrocarbon producing reservoir; and one or more computer processors that derive an aligned monitor survey from the baseline seismic survey and the monitor seismic survey using an error function having a phase-based component.

A nontransitory computer readable information storage medium including software that, when executed by a computer, causes the computer to implement a method including: obtaining baseline traces of a baseline seismic survey during a first time period and monitor traces of a monitor seismic survey during a second time period, the baseline seismic survey and the monitor seismic survey representative of a subterranean hydrocarbon producing reservoir; employing a computer to align the monitor traces to corresponding baseline traces using an error function having a phase-based component, thereby obtaining an aligned monitor survey; and generating with the computer a comparison of the aligned monitor survey to the baseline seismic survey.

The phase-based component of the error function may include a difference between instantaneous phases of the baseline and monitor traces, and the difference between instantaneous phases of the baseline and monitor traces may be squared. The phase-based component may include a difference between derivatives of the baseline and monitor traces, and the difference between derivatives of the baseline and monitor traces may be squared. The error function may include a weighted sum of: the squared difference between derivatives of the baseline and monitor traces; and a squared difference between the baseline and monitor traces. The comparison may be a difference between the baseline seismic survey and the aligned monitor survey. As such, the changes occurring in the formation may be determined, and a time-lapse difference dataset may be created showing the changes in the formation, e.g., as part of a 4D seismic survey.

The above summary section is provided to introduce a selection of concepts in a simplified form that are further described below in the detailed description section. The summary is not intended to identify any essential or key elements of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present disclosure will become better understood with regard to the following description, claims, and accompanying drawings where:

Figure 1:
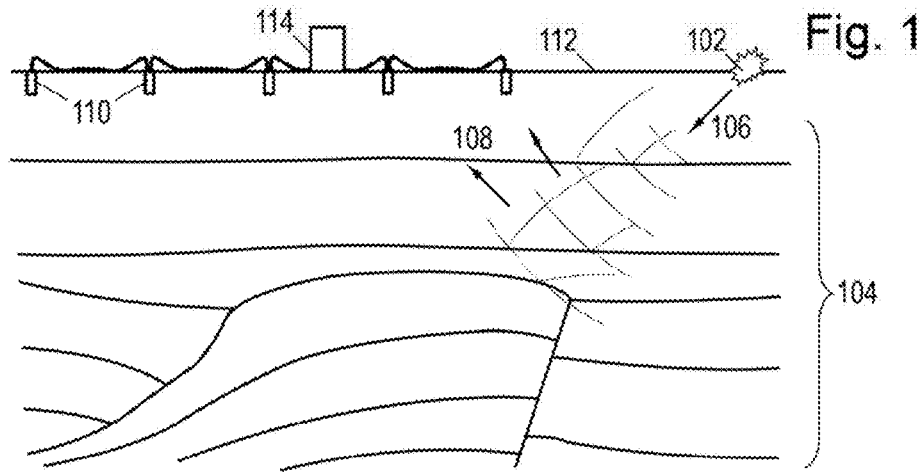
FIG. 1 is a schematic depiction of an illustrative seismic survey.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

To put the disclosed implementations of alignment between monitor and baseline surveys in context, it is useful to understand how seismic imaging is performed. As illustrated in FIG. 1, a seismic survey is performed. Although a land seismic survey is shown being performed, the seismic survey may be performed in water in at least one embodiment. An energy source 102 near the region of interest 104 generates seismic waves 106 that propagate into the region of interest and reflect from internal features such as bed boundaries. Eventually, the reflected waves 108 reach an array of receivers 110 on the surface 112. A recording system 114 captures the received signals for storage and processing. The process is repeated with different source positions and optionally with different receiver positions. A first seismic survey performed before a second seismic survey on the same region of interest is called the baseline seismic survey, and the second seismic survey is called the monitor seismic survey. As explained in the background, the baseline seismic survey is performed at a different time period than the monitor seismic survey, e.g., as part of a 4D seismic survey.

Figure 2:
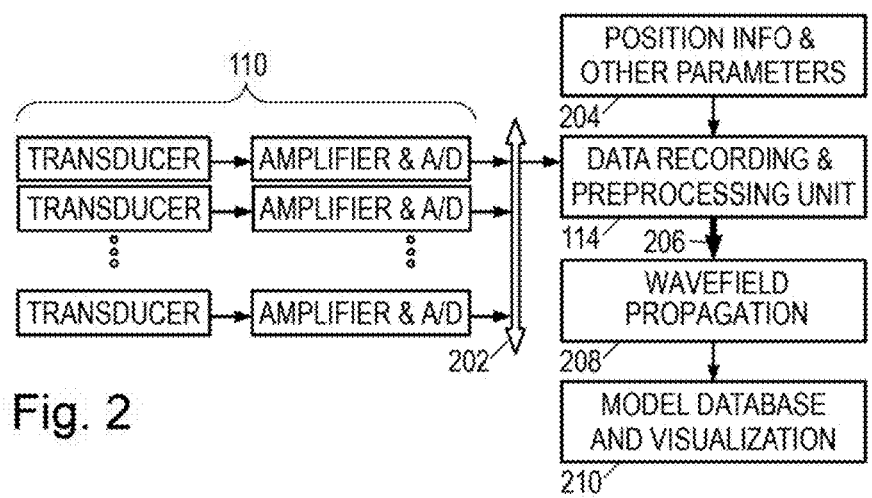
FIG. 2 is a block diagram of an illustrative subsurface imaging system.
Figure 3:
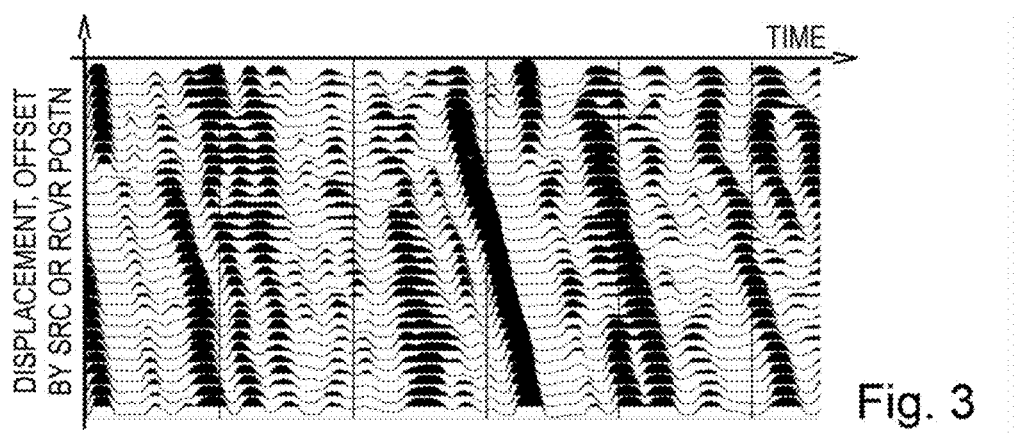
FIG. 3 is a graph of an illustrative seismic gather.

As indicated in FIG. 2, the array of seismic receivers 110 converts the seismic waves to electrical signals that are amplified and digitized. FIG. 3 shows an illustrative set of signal waveforms, each waveform representing displacement, velocity, acceleration, pressure, amplitude, or some other wave attribute, detected by a given receiver as a function of time after the corresponding shot. (Waveforms associated with specified source and receiver positions may be referred to herein as "traces", and collections of multiple traces may be referred to herein as "gathers") To make the individual waveforms legible, the waveform for each receiver is offset from the next, with the positive-valued portions of the waveform filled in and the negative-valued portions shown as a bare line. If each of the waveforms shown corresponds to the same firing of the source, the set of traces is termed a "shot gather". If each of the waveforms is obtained by a receiver at the same offset from the shot location, the set of traces is termed an "offset gather". (Offset gathers are common in marine seismic surveys having the source and the receiver array towed by the same boat, as a given receiver is always at the same offset from the source.)

Returning to FIG. 2, a recording system 114 collects the digitized signals via a bus 202 or other communications pathway and stores the digitized signals on an information storage medium for later processing. Typically, each digitized signal is associated with parameters 204 such as a receiver location, a shot location, and the like. Recording system 114 may perform some initial processing to filter and/or compress the data, and in at least some cases, to perform quality control.

The recording system 114 provides the baseline and monitor seismic survey data via the Internet or other communications mechanism 206 to a data processing center 208 having sufficient computational resources for the imaging process. The data processing center includes one or more computers that may use target-oriented seismic imaging methods to convert the recorded seismic signals into a three-dimensional map or "image" of the subsurface structure which can be stored in a model database 210 or other persistent storage that supports rendering of visual representations for display and comparison, e.g., as part of a 4D seismic survey.

To simulate the wave field and construct the image, the data processing center models the region of interest as a three-dimensional space divided into an orthogonal grid of cells. The properties of all of the points within a cell are assumed to be uniform. Typically, the imaging process yields for each cell some measure of reflectivity or coherence, from which the boundaries between the various stratigraphic layers can be extracted. Properties for each layer can be refined and augmented with further analysis, which may include processing to extract velocity, dispersion, and angular dependence of the propagating seismic energy. Additional sources of information (such as well logs, simulations, and stratigraphic interpretation) may also be exploited to measure, extrapolate, or otherwise estimate properties of each cell.

Figure 4A:
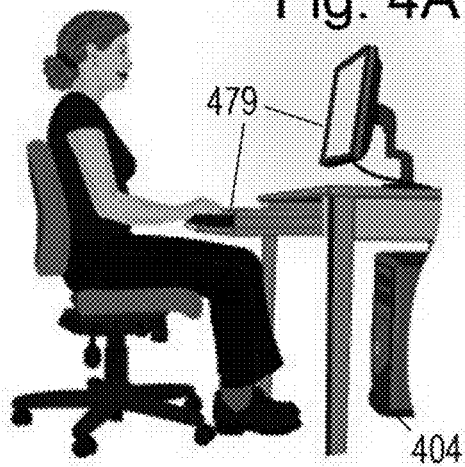
FIG. 4A is a contextual view showing illustrative usage of the subsurface imaging system.
Figure 4B:
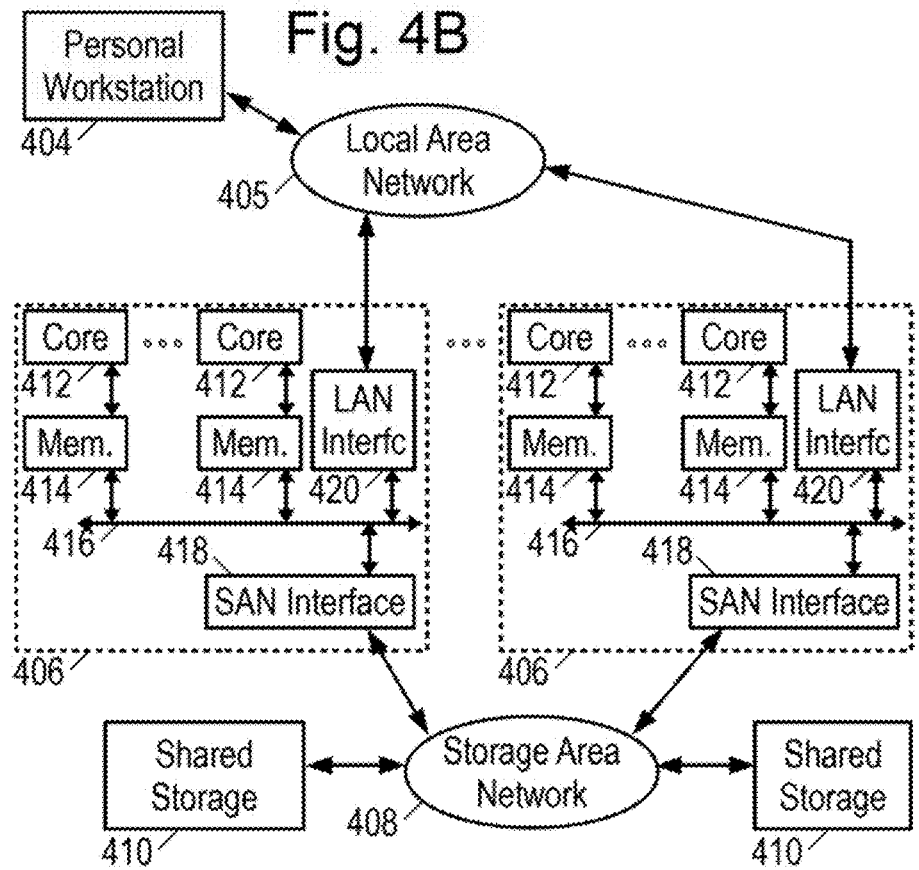
FIG. 4B is a block diagram of an illustrative hardware platform suitable for imaging.

As shown in FIG. 4A, an analyst employs a user interface 479 of a workstation 404 to control the seismic imaging process, including the alignment process, and to view and analyze the resulting seismic images. The workstation 404 is part of the hardware platform of a seismic imaging system such as that shown in FIG. 4B. The illustrative hardware platform couples the workstation 404 to one or more multi-processor computers 406 via a local area network (LAN) 405. The one or more multi-processor computers 406 are in turn coupled via a storage area network (SAN) 408 to one or more shared storage units 410. Using the personal workstation 404, the analyst is able to load seismic survey data into the system, to configure and monitor the processing of the seismic survey data and to retrieve the resulting volumetric seismic images from the system, optionally in the form of two-dimensional cross-sections that can be viewed and compared as a function of time to detect changes in the subsurface.

Personal workstation 404 may take the form of a desktop computer with a display that shows graphical representations of the input and result data, and with a keyboard that enables the user to move files and execute processing software. LAN 405 provides high-speed communication between multi-processor computers 406 and with personal workstation 404. The LAN 405 may take the form of an Ethernet network.

Multi-processor computer(s) 406 provide parallel processing capability to enable suitably prompt processing of the input data to derive the results data. Each computer 406 includes multiple processors 412, distributed memory 414, an internal bus 416, a SAN interface 418, and a LAN interface 420. Each processor 412 operates on allocated tasks to solve a portion of the overall imaging problem and contribute to at least a portion of the overall results. Associated with each processor 412 is a distributed memory module 414 that stores application software and a working data set for the processor's use. Internal bus 416 provides inter-processor communication and communication to the SAN or LAN networks via the corresponding interfaces 418, 420. Communication between processors in different computers 406 can be provided by LAN 405.

SAN 408 provides high-speed access to shared storage devices 410. The SAN 408 may take the form of, e.g., a Fibrechannel or Infiniband network. Shared storage units 410 may be large, stand-alone information storage units that employ magnetic disk media for nonvolatile data storage. To improve data access speed and reliability, the shared storage units 410 may be configured as a redundant disk array ("RAID").

Figure 5:
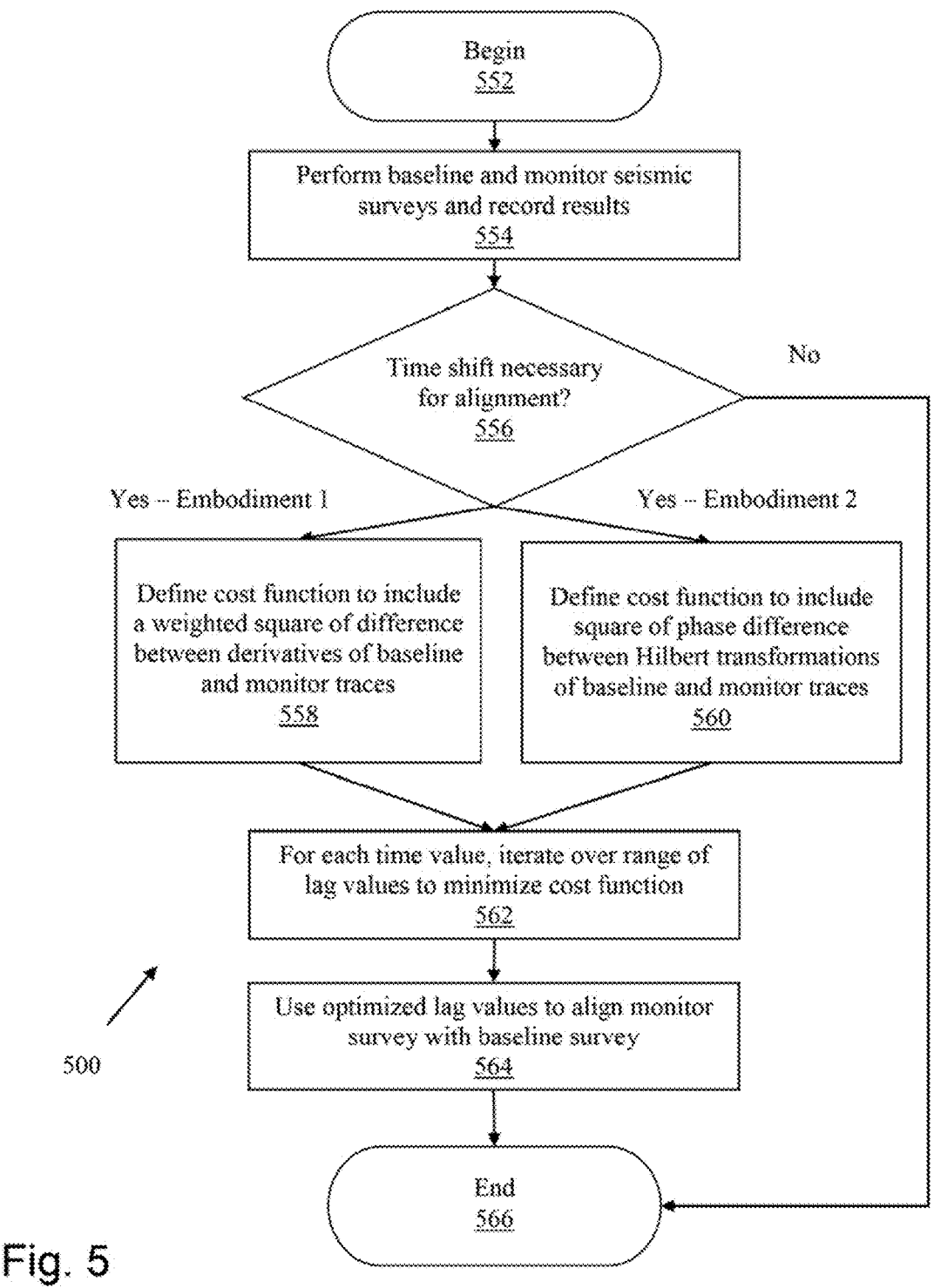
FIG. 5 is a flow diagram of illustrative methods of aligning seismic data between surveys.

FIG. 5 is a flowchart of an illustrative method 500 of aligning a monitor seismic survey with a baseline seismic survey, beginning at 552 and ending at 566, to remove the effects of seismic velocity changes in the subsurface. At 554, the baseline and monitor seismic surveys are performed, and the results of the surveys are recorded as described with respect to FIG. 1 above. The surveys may be a data source stored on a distributed storage system in at least one embodiment. At 556, it is determined if a time shift is necessary for alignment due to differing velocities of seismic waves between the surveys. Specifically, portions of the monitor survey may be shifted positively (forward) and/or negatively (backward) on the time axis to correct for displacement due to the differing velocities. If no time shift is necessary, the method 500 ends. If a time shift is necessary, one of two embodiments may be used to prevent overcorrection or spurious time shifts.

Figure 6:
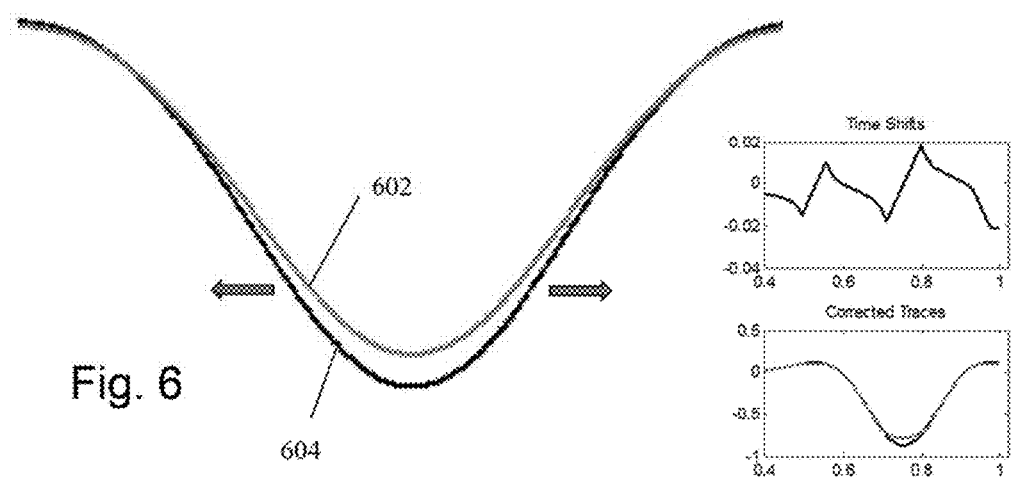
FIG. 6 is a set of graphs demonstrating an illustrative overcorrection or spurious shift of an unshifted signal.

Turning to FIG. 6, the cause of a spurious time shift is illustrated. The top curve represents a monitor trace 602 and the bottom curve represents a baseline trace 604. Note that monitor trace 602 is attenuated but unshifted relative to trace 604. When a conventional time-warping method is applied, portions of the monitor trace amplitude 602 are shifted positively and negatively as indicated by the time shift graph. The resultant curves are shown in the corrected traces graph. In its efforts to provide better curve matching, the conventional time-warping method has needlessly distorted the monitor trace, causing some amplitude information to be lost. Specifically, the difference in amplitude between the resultant monitor trace and the baseline trace is smaller. As such, it is more difficult to distinguish amplitude contrasts between the monitor seismic survey and the baseline seismic survey.

The amplitude contrasts represent an impedance differential within the formation, which are of interest in locating reservoirs of, e.g., hydrocarbons and tracking fluid motion in the reservoir over time. Because the two traces are already aligned (i.e., with a time shift of zero), all of the illustrated time shifts are a spurious overcorrection called a warping error. The spurious time shifts are a result of minimizing an error, or cost, function associated with the alignment:

$$e(i,l)=(B(i)-M(i+l))^2 \qquad (1)$$

where B is the sampled baseline trace amplitude, M is the sampled monitor trace amplitude, i is the sample index, and l is the lag value between the monitor seismic survey and baseline seismic survey.

Returning to FIG. 5, at 558 a first embodiment of the improved alignment method is illustrated, with an error, or error minimization, function being defined to include not only the square of the amplitude difference, but also the weighted square of the difference between the first derivative of the baseline trace and the monitor trace:

$$e(i,l)=(B(i)-M(i+l))^2+\lambda*(B'(i)-M'(i+l))^2 \qquad (2)$$

where B is the sampled baseline trace amplitude, M is the sampled monitor trace amplitude, i is the sample index, l is the lag value between the monitor seismic survey and baseline seismic survey, $\lambda$ is a weighting factor, B' is the first derivative of the baseline trace amplitude, and M' is the first derivative of the monitor trace amplitude. Similarly, in other embodiments, second, third, and/or higher derivatives may be used. Equation (2) uses a squared difference, but alternative embodiments may include other powers, including an absolute value of the difference raised to any power greater than zero. In at least one embodiment, the weighting factor is 0.1, however, in other embodiments different weighting factors may be used to achieve balanced error contributions between the amplitude and derivative differences. The first derivative of the baseline and monitor traces contains phase information, enabling the alignment method to reduce spurious shifting of already-aligned traces. Accordingly, the warping error is minimized or eliminated.

Figure 8:
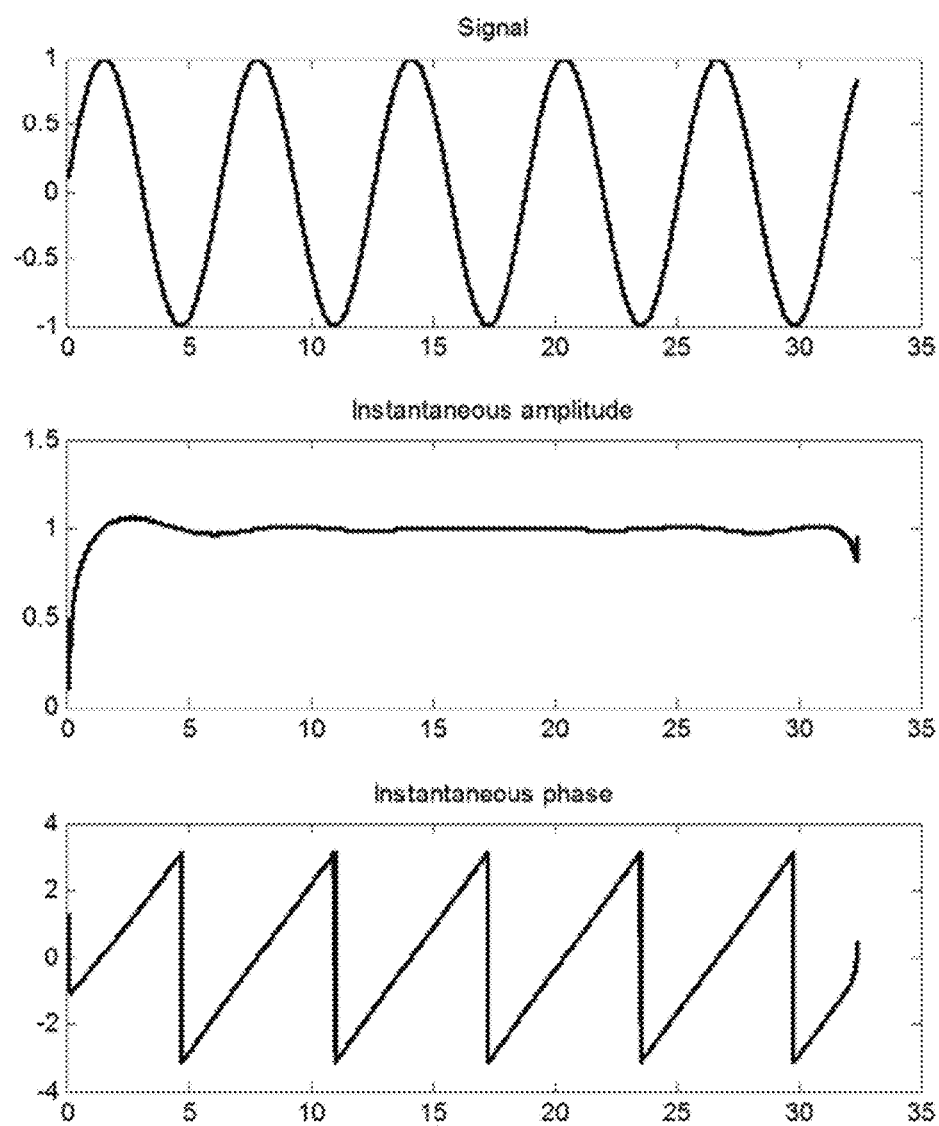
FIG. 8 shows graphs of an illustrative signal and its Hilbert transformation expressed in terms of magnitude and phase.
Figure 9:
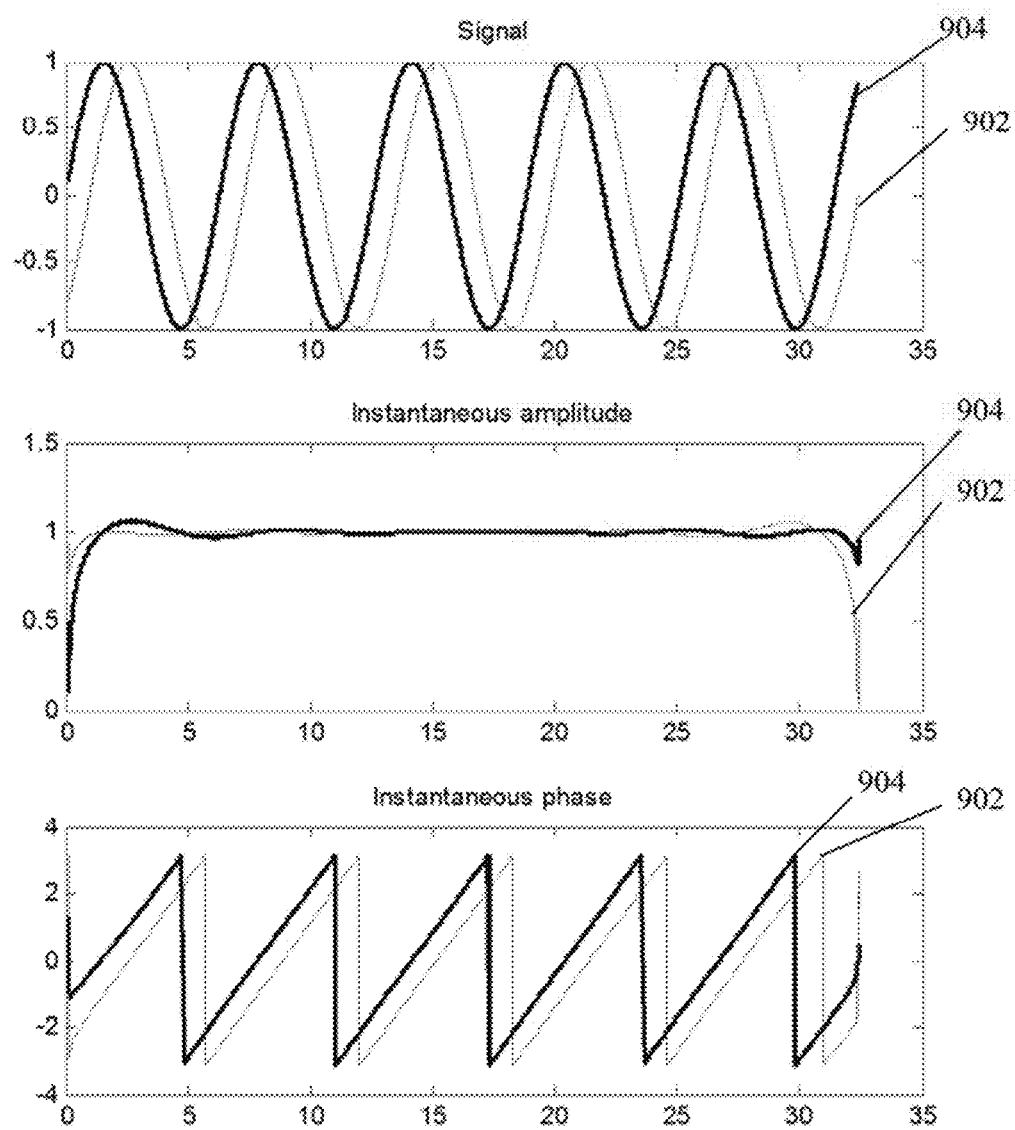
FIG. 9 shows graphs comparing the illustrative signal and its Hilbert transformation, expressed in terms of magnitude and phase, with a shifted signal and its Hilbert transformation, also expressed in terms of magnitude and phase.
Figure 10:
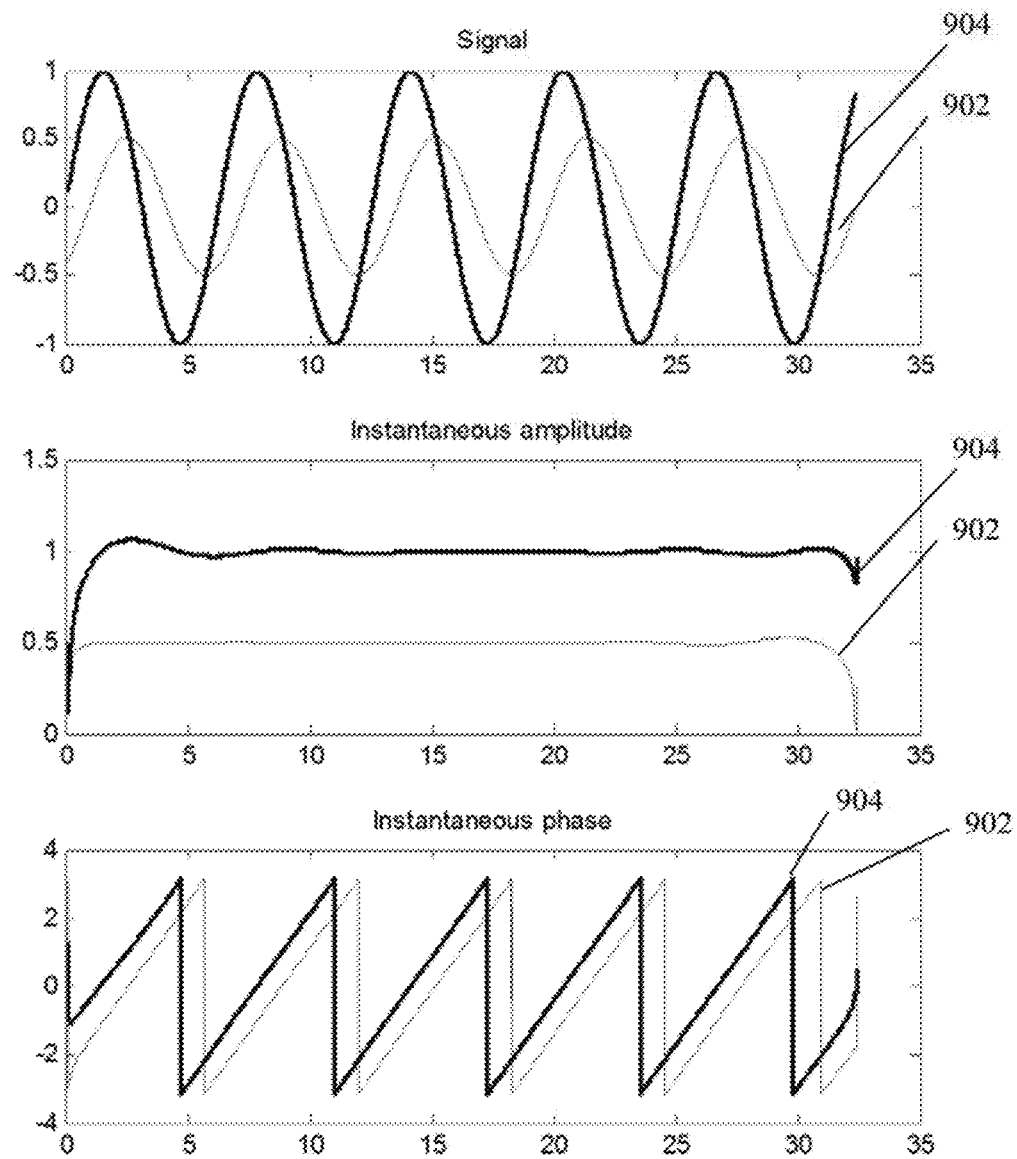
FIG. 10 shows graphs comparing the illustrative signal and its Hilbert transformation, expressed in terms of magnitude and phase, with an attenuated and shifted signal and corresponding transformation.

At 560, an alternative embodiment of the improved alignment method is illustrated, with the error function being defined to include a square of the phase difference between Hilbert transformations of the baseline trace amplitude and monitor trace amplitude. The Hilbert transformation of a time signal produces an "analytic" (complex-valued) signal in the time domain. Complex values can be expressed in terms of a magnitude and phase. The magnitude represents the signal envelope, while the phase of the analytic signal represents the instantaneous phase of the time signal. By minimizing the difference in instantaneous phase between the baseline and monitor surveys, it is possible to align the traces essentially without distortion due to amplitude changes. FIGS. 8, 9, and 10 illustrate the use of Hilbert transformations, which are described by:

$$H(u)(t) = \frac{1}{\pi} p.v. \int_{-\infty}^{\infty} \frac{u(\tau)}{t-\tau} d\tau \qquad (3)$$

Turning to FIG. 8, the top graph shows a sample input signal. For clarity, a simple sinusoidal input signal is used. When the Hilbert transformation is applied, it yields an analytic signal having the envelope shown in the middle graph and the instantaneous phase shown in the bottom graph. As illustrated, the envelope for the input signal settles at 1, while the instantaneous phase for the input signal is a saw tooth curve bounded between positive and negative pi.

Turning to FIG. 9, the top graph shows the sinusoidal input signal and a second, time shifted, sinusoidal input signal. These input signals may represent the monitor trace amplitude 902 and the baseline trace amplitude 904. When the Hilbert transformation is applied, the envelope for both signals settles at 1, as shown in the middle graph. However, the instantaneous phase of the monitor trace amplitude 902 is shifted from the instantaneous phase of the baseline trace amplitude, as shown in the bottom graph. As such, changes in the seismic wave velocities, and their associated time shifts, appear only in instantaneous phase.

Turning to FIG. 10, the top graph shows the sinusoidal input signal and a second, time shifted and attenuated sinusoidal input signal. These input signals may represent the monitor trace amplitude 902 and the baseline trace amplitude 904. When the Hilbert transformation is applied, the envelope for the baseline trace amplitude 904 settles at 1 whereas the instantaneous amplitude for the monitor trace amplitude 902 settles at 0.5, as shown in the middle graph. The instantaneous phase of the monitor trace amplitude 902 is shifted from the instantaneous phase of the baseline trace 904 amplitude, as illustrated in the bottom graph, precisely as with the example of FIG. 9. As such, changes in the reflectivity of the seismic waves appear only in instantaneous amplitude and are separated from the time shifts.

Returning to FIG. 5, the phase information of the baseline trace amplitude and the monitor trace amplitude may be incorporated into the error function in block 560 by performing a Hilbert transformation (H) on both, yielding:

$$e(i,l) = (\text{Phase}\{H(B(i))\} - \text{Phase}\{H(M(i+l))\})^2 \qquad (4)$$

Where H is the Hilbert transformation, B is the sampled baseline trace amplitude, M is the sampled monitor trace amplitude, i is the sample index, and l is the lag value between the monitor seismic survey and baseline seismic survey. Equation (4) uses a squared difference, but alternative embodiments may include other powers, including an absolute value of the difference raised to any power greater than zero.

Figure 7:
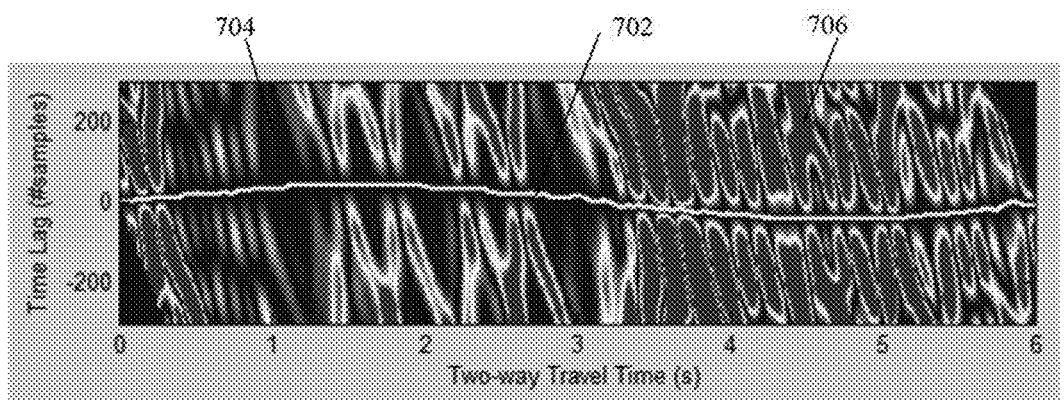
FIG. 7 is a graph of an illustrative error as a function of lag and travel time.

At 562, for each time value, i, in Equations (2) and (4), the error function e(i,l) (whether defined pursuant to block 558 or 560) is calculated over a range of lag values (l). FIG. 7 shows an illustrative error function calculation as a function of travel time (sample index) and time lag. Shading represents the error, with the darker shading 704 representing lower values and lighter shading 706 representing higher values.

By selecting lag values producing the lowest error for each time value, a set of data points may be determined and a curve may be fitted to those data points using regression analysis or other curve fitting techniques to provide for "smoothed" time shifting. Curve 702 shows the resulting optimal lag values as a function of the two-way travel time of seismic waves that yield the minimized error function.

Retuning to FIG. 5, at 564 the monitor seismic survey may be aligned with the baseline seismic survey by using the optimized lag values. Warping error in the resultant survey comparison is substantially reduced or eliminated entirely by improving the accuracy and robustness of time-shift calculations in time-lapse seismic data, leading to better qualitative interpretation of production-related effects and more accurate quantitative estimates of pressure, saturation, and geomechanical changes in the subsurface. Additional benefits include better well placement, more precise monitoring of bypassed hydrocarbons, and more accurate production forecasting for improved reservoir management decisions.

The disclosed alignment techniques can be implemented in numerous ways, including, for example, as a system (including a computer processing system), a method (including a computer implemented method), an apparatus, a computer readable medium, a computer program product, a graphical user interface, a web portal, or a data structure tangibly fixed in a computer readable memory. The present disclosure may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present disclosure may be coded in different languages for application in a variety of computing platforms, environments, and architectures. It will be appreciated that the scope and underlying principles of the present disclosure are not limited to any particular computer software technology. Also, an article of manufacture for use with a computer processor, such as a CD, pre-recorded disk or other equivalent devices, may include a tangible non-transitory computer program storage medium and program means recorded thereon for directing the computer processor to facilitate the implementation and practice of the disclosed techniques. Such devices and articles of manufacture also fall within the scope of the appended claims.

Moreover, those skilled in the art will appreciate that the disclosed techniques may be practiced using any one or combination of hardware and software configurations, including, but not limited to, a system having single and/or multiple processor computers, hand-held devices, tablet devices, programmable consumer electronics, mini-computers, mainframe computers, and the like. The disclosed techniques may also be practiced in distributed computing environments where tasks are performed by servers or other processing devices that are linked through one or more data communications networks. In a distributed computing environment, program modules may be located in both local and remote computer storage media, including memory storage devices.

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or method steps shown or described in any one embodiment herein can be used in other embodiments as well.

What is claimed is:

1. A seismic monitoring method for determining a change in a subterranean hydrocarbon producing reservoir, comprising:
    a. obtaining baseline traces of a baseline seismic survey during a first time period and monitor traces of a monitor seismic survey during a second time period from a seismic data source comprising a plurality of seismic receivers, the baseline seismic survey and the monitor seismic survey representative of the subterranean hydrocarbon producing reservoir;
    b. employing a computer to align the monitor traces to corresponding baseline traces by time-shifting the monitor traces and using an error function having a phase-based component to correct for a warping error in the monitor traces, thereby obtaining an aligned monitor survey;
    c. generating with the computer a comparison of the aligned monitor survey to the baseline seismic survey; and
    d. using the comparison of the aligned monitor survey to the baseline seismic survey to determine a change in the subterranean hydrocarbon producing reservoir between the first time period and the second time period.

2. The method of claim 1, wherein the phase-based component includes a difference between instantaneous phases of the baseline and monitor traces.

3. The method of claim 1, wherein the phase-based component includes a difference between derivatives of the baseline and monitor traces.

4. The method of claim 3, wherein the derivatives are second or higher derivatives.

5. The method of claim 3, wherein the error function comprises a weighted sum of:
    the difference between derivatives of the baseline and monitor traces, raised to a power; and
    a difference between the baseline and monitor traces, raised to a power.

6. The method of claim 1, further comprising calculating the phase-based component by performing a Hilbert transformation on the baseline traces and performing a Hilbert transformation on the monitor traces.

7. The method of claim 6, wherein the error function is expressible as:

$$e(i,l) = (\text{Phase}\{H(B(i))\} - \text{Phase}\{H(M(i+l))\})^2.$$

8. A seismic monitoring system for determining a change in a subterranean hydrocarbon producing reservoir, comprising:
    a seismic data source comprising a plurality of seismic receivers, the seismic data source further configured to receive seismic signals and convert the seismic signals to electrical signals, the electrical signals comprising:
        a baseline seismic survey, obtained during a first time period, comprising baseline traces; and
        a monitor seismic survey, obtained during a second time period, comprising monitor traces, the baseline seismic survey and the monitor seismic survey representative of the subterranean hydrocarbon producing reservoir;
    a computing system including one or more computer processors communicatively connected to the seismic data source, the one or more computer processors being programmed to derive an aligned monitor survey from the baseline seismic survey and the monitor seismic survey by time-shifting the monitor traces and using an error function having a phase-based component to correct for a warping error in the monitor traces,
    wherein the aligned monitor survey is output to a display of the computing system and illustrates a change in the subterranean hydrocarbon producing reservoir between the first time period and the second time period.

9. The system of claim 8, wherein the phase-based component includes a difference between instantaneous phases of the baseline and monitor traces.

10. The system of claim 8, wherein the phase-based component includes a difference between derivatives of the baseline and monitor traces.

11. The system of claim 10, wherein the derivatives are second or higher derivatives.

12. The system of claim 10, wherein the error function includes a weighted sum of:
    the difference between derivatives of the baseline and monitor traces, raised to a power; and
    a difference between the baseline and monitor traces, raised to a power.

13. The system of claim 8, wherein the error function comprises a Hilbert transformation of the baseline traces and a Hilbert transformation of the monitor traces.

14. The system of claim 8, wherein the error function is expressible as:

$$e(i,l) = (\text{Phase}\{H(B(i))\} - \text{Phase}\{H(M(i+l))\})^2.$$

15. A nontransitory computer-readable information storage medium comprising software that, when executed by a computer, causes the computer to implement a method comprising:
    obtaining baseline traces of a baseline seismic survey during a first time period and monitor traces of a monitor seismic survey during a second time period from a seismic data source comprising a plurality of seismic receivers, the baseline seismic survey and the monitor seismic survey representative of a subterranean hydrocarbon producing reservoir;
    employing a computer to align the monitor traces to corresponding baseline traces by time-shifting the monitor traces and using an error function having a phase-based component to correct for a warping error in the monitor traces, thereby obtaining an aligned monitor survey;
    generating with the computer a comparison of the aligned monitor survey to the baseline seismic survey; and
    using the comparison of the aligned monitor survey to the baseline seismic survey to determine a change in the subterranean hydrocarbon producing reservoir between the first time period and the second time period.

16. The medium of claim 15, wherein the phase-based component includes a difference between instantaneous phases of the baseline and monitor traces.

17. The medium of claim 15, wherein the phase-based component includes a difference between derivatives of the baseline and monitor traces.

18. The system of claim 17, wherein the derivatives are second or higher derivatives.

19. The medium of claim 17, wherein the error function includes a weighted sum of:
    the difference between derivatives of the baseline and monitor traces, raised to a power; and
    a difference between the baseline and monitor traces, raised to a power.

20. The medium of claim 15, wherein the error function is expressible as:

$$e(i,l) = (\text{Phase}\{H(B(i))\} - \text{Phase}\{H(M(i+l))\})^2.$$

21. The medium of claim 15, wherein the error function comprises a Hilbert transformation of the baseline traces and a Hilbert transformation of the monitor traces.

* * * * *